United States Patent
Naito et al.

(10) Patent No.: US 8,452,138 B2
(45) Date of Patent: May 28, 2013

(54) OPTICAL SENSOR MODULE

(75) Inventors: Ryusuke Naito, Ibaraki (JP); Emiko Tani, Ibaraki (JP); Masayuki Hodono, Ibaraki (JP); Yusuke Shimizu, Ibaraki (JP); Kei Nakamura, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/361,230

(22) Filed: Jan. 30, 2012

(65) Prior Publication Data

US 2012/0201490 A1 Aug. 9, 2012

Related U.S. Application Data

(60) Provisional application No. 61/445,264, filed on Feb. 22, 2011.

(30) Foreign Application Priority Data

Feb. 3, 2011 (JP) .................................. 2011-021857

(51) Int. Cl.
*G02B 6/10* (2006.01)
*G02B 6/42* (2006.01)

(52) U.S. Cl.
USPC ................................ 385/14; 385/52; 385/132

(58) Field of Classification Search
None
See application file for complete search history.

(56) References Cited

U.S. PATENT DOCUMENTS

| | | |
|---|---|---|
| 5,222,175 A | 6/1993 | Tatoh |
| 5,265,184 A | 11/1993 | Lebby et al. |
| 5,319,725 A | 6/1994 | Buchmann et al. |
| 5,359,686 A | 10/1994 | Galloway et al. |
| 5,428,704 A | 6/1995 | Lebby et al. |
| 5,446,814 A | 8/1995 | Kuo et al. |
| 5,521,992 A | 5/1996 | Chun et al. |
| 5,780,875 A | 7/1998 | Tsuji et al. |
| 5,835,646 A | 11/1998 | Yoshimura et al. |

(Continued)

FOREIGN PATENT DOCUMENTS

| | | |
|---|---|---|
| CN | 101014889 A | 8/2007 |
| CN | 101002123 A | 7/2008 |

(Continued)

OTHER PUBLICATIONS

Office Action issued on Sep. 26, 2012, in related U.S. Appl. No. 12/847,121.

(Continued)

*Primary Examiner* — Michelle R Connelly
(74) *Attorney, Agent, or Firm* — Westerman, Hattori, Daniels & Adrian, LLP

(57) ABSTRACT

An optical sensor module is provided in which an engagement portion of a board unit is fitted in a groove of an optical waveguide unit and, even with the single engagement portion, the board unit is stably supported. An optical sensor module includes an optical waveguide unit, and a board unit mounted with an optical element and coupled to the optical waveguide unit. The optical waveguide unit includes a single edge extension portion axially extending along one side edge of an over-cladding layer, a board unit engagement groove provided in the single edge extension portion, and a projection provided on a side wall of the vertical groove and kept in abutment against an engagement portion of the board unit. The board unit includes an engagement portion fitted in the vertical groove, which abuts against the projection within the vertical groove.

1 Claim, 10 Drawing Sheets

U.S. PATENT DOCUMENTS

| | | | |
|---|---|---|---|
| 5,905,831 | A | 5/1999 | Boudreau et al. |
| 5,909,523 | A | 6/1999 | Sakaino et al. |
| 6,042,276 | A | 3/2000 | Tachigori |
| 6,088,498 | A | 7/2000 | Hibbs-Brenner et al. |
| 6,456,766 | B1 * | 9/2002 | Shaw et al. .................. 385/47 |
| 6,541,762 | B2 | 4/2003 | Kang et al. |
| 6,912,333 | B2 | 6/2005 | Mikawa et al. |
| 6,917,056 | B2 | 7/2005 | Dautartas et al. |
| 7,063,467 | B2 | 6/2006 | Nagasaka et al. |
| 7,146,080 | B2 * | 12/2006 | Neta et al. .................. 385/40 |
| 7,150,569 | B2 | 12/2006 | Oono et al. |
| 7,184,630 | B2 | 2/2007 | Kwon et al. |
| 7,310,457 | B2 | 12/2007 | Kotake |
| 7,313,293 | B2 | 12/2007 | Murashima et al. |
| 7,317,861 | B2 | 1/2008 | Ohtsu et al. |
| 7,333,682 | B2 | 2/2008 | Kobayashi et al. |
| 7,373,033 | B2 | 5/2008 | Lu et al. |
| 7,668,414 | B2 | 2/2010 | Shemi et al. |
| 7,724,988 | B2 * | 5/2010 | Dellmann et al. .............. 385/14 |
| 7,898,736 | B2 | 3/2011 | Jacobowitz et al. |
| 8,014,638 | B2 | 9/2011 | Nakano et al. |
| 2002/0076161 | A1 | 6/2002 | Hirabayashi et al. |
| 2003/0219208 | A1 | 11/2003 | Kwon et al. |
| 2004/0001661 | A1 * | 1/2004 | Iwaki et al. .................. 385/14 |
| 2004/0190831 | A1 * | 9/2004 | Lu et al. .................. 385/49 |
| 2004/0234210 | A1 | 11/2004 | Nagasaka et al. |
| 2005/0100264 | A1 | 5/2005 | Kim et al. |
| 2005/0185892 | A1 | 8/2005 | Kwon et al. |
| 2005/0201667 | A1 | 9/2005 | Neta et al. |
| 2005/0207718 | A1 | 9/2005 | Komura et al. |
| 2006/0093259 | A1 | 5/2006 | Oggioni et al. |
| 2007/0127865 | A1 | 6/2007 | Lu et al. |
| 2007/0297713 | A1 | 12/2007 | Lu et al. |
| 2009/0016670 | A1 | 1/2009 | Shemi et al. |
| 2009/0279827 | A1 | 11/2009 | Sano et al. |
| 2009/0285580 | A1 | 11/2009 | Yasuda et al. |
| 2010/0254666 | A1 | 10/2010 | Hodono |
| 2011/0026873 | A1 | 2/2011 | Hodono |
| 2011/0085758 | A1 | 4/2011 | Hodono |
| 2011/0216995 | A1 | 9/2011 | Hodono |
| 2012/0027338 | A1 | 2/2012 | Hodono |
| 2012/0051684 | A1 | 3/2012 | Hodono |
| 2012/0201490 | A1 | 8/2012 | Naito et al. |

FOREIGN PATENT DOCUMENTS

| | | | |
|---|---|---|---|
| CN | 101430401 | A | 5/2009 |
| CN | 101859006 | A | 10/2012 |
| EP | 0548440 | A1 | 6/1993 |
| JP | 5-196831 | A | 8/1993 |
| JP | 2004-302345 | A | 10/2004 |
| JP | 2008-102283 | A | 5/2008 |
| JP | 2009180723 | A | 8/2009 |
| JP | 2011-033876 | A | 2/2011 |
| JP | 2011-102955 | A | 5/2011 |
| WO | 2004/015463 | A1 | 2/2004 |
| WO | 2009/001969 | A2 | 12/2008 |

OTHER PUBLICATIONS

European Search Report dated Jul. 13, 2010, issued in related European Patent Application No. 10159096.

Japanese Patent Application of 2009-180723, filing date Aug. 3, 2009 (cited in Specification of co-pending related U.S. Appl. No. 12/900,647).

U.S. Office Action dated Apr. 27, 2011, issued in related U.S. Appl. No. 13/020,936.

U.S. Notice of Allowance dated Oct. 2, 2012, issued in related U.S. Appl. No. 13/211,096.

U.S. Notice of Allowance dated Oct. 1, 2012, issued in related U.S. Appl. No. 13/184,865.

U.S. Notice of Allowance dated Oct. 25, 2012, issued in related U.S. Appl. No. 12/900,964.

U.S. Notice of Allowance dated Aug. 25, 2011, issued in related U.S. Appl. No. 13/020,936.

U.S. Notice of Allowance dated Jan. 4, 2013, issued in related U.S. Appl. No. 13/040,849.

Chinese Office Action dated Aug. 22, 2012, issued in related Chinese Patent Application No. 201010244781.0, with English translation (10 pages).

* cited by examiner

RELATED ART

RELATED ART

OPTICAL SENSOR MODULE

RELATED APPLICATIONS

This application claims the benefit of U.S. Provisional Application No. 61/445,264 filed on Feb. 22, 2011, which is hereby incorporated by reference.

BACKGROUND OF THE INVENTION

1. Field of the Invention

The present invention relates to an optical sensor module including an optical waveguide unit and a board unit mounted with an optical element.

2. Description of the Related Art

As shown in FIGS. 9A and 9B, an optical sensor module is produced by individually producing an optical waveguide unit $W_0$ including an under-cladding layer 71, a core 72 and an over-cladding layer 73 provided in this order, and a board unit $E_0$ including an optical element 82 mounted on a substrate 81, and then bonding the board unit $E_0$ to an end portion of the optical waveguide unit $W_0$ with an adhesive or the like with the core 72 of the optical waveguide unit $W_0$ in alignment with the optical element 82 of the board unit $E_0$. In FIGS. 9A and 9B, a reference character 75 designates a base, and a reference character 85 designates a sealing resin.

The alignment between the core 72 of the optical waveguide unit $W_0$ and the optical element 82 of the board unit $E_0$ is generally achieved with the use of a self-aligning machine (see, for example, JP-A1-HEI5 (1993)-196831). In this self-aligning machine, the optical waveguide unit $W_0$ is fixed to a stationary stage (not shown) and the board unit $E_0$ is fixed to a movable stage (not shown) for the alignment. Where the optical element 82 is a light emitting element, an alignment position (at which the core 72 is properly aligned with the optical element 82) is determined, as shown in FIG. 9A, by changing the position of the board unit $E_0$ relative to one end face (light inlet) 72a of the core 72 with light $H_1$ being emitted from the light emitting element, monitoring the amount of light outputted from the other end face (light outlet) 72b of the core 72 through a lens portion 73b provided at a distal end of the over-cladding layer 73 (monitoring a photovoltaic voltage developed across a light receiving element 91 provided in the self-aligning machine), and then defining a position at which the light amount is maximum as the alignment position. Where the optical element 82 is a light receiving element, the alignment position is determined, as shown in FIG. 9B, by changing the position of the board unit $E_0$ relative to the one end face 72a of the core 72 with a predetermined amount of light (light emitted from a light emitting element 92 provided in the self-aligning machine and transmitted through the lens portion 73b provided at the distal end of the over-cladding layer 73) $H_2$ being inputted from the other end face 72b of the core 72 and outputted through a tail end portion 73a of the over-cladding layer 73 from the one end face 72a of the core 72, monitoring the amount of light received by the light receiving element (monitoring a photovoltaic voltage), and defining a position at which the light amount is maximum as the alignment position.

The alignment achieved by utilizing the self-aligning machine is highly accurate, but is unsuitable for mass production with the need for labor and time.

There is an optical sensor module which permits easy alignment without the need for the aforementioned machine and labor (Japanese Patent Application No. 2009-180723). In the optical sensor module, as shown in plan in FIG. 10A and in perspective in FIG. 10B with its right end viewed from an upper right side, an optical waveguide unit $W_1$ includes an over-cladding layer 43 having opposite side extension portions (upper and lower portions on a right side in FIG. 10A) which extend in a core axial direction (in a rightward direction in FIG. 10A) and are free from a core 42. The extension portions 44 respectively have board unit engaging vertical grooves 44a provided in pair in proper positions thereof relative to a light transmission face (one end face) 42a of the core 42 as extending thicknesswise of the optical waveguide unit $W_1$. On the other hand, a board unit $E_1$ includes engagement portions 51a provided in proper positions relative to an optical element 54 in left and right edge portions (laterally opposite edge portions) thereof to be brought into fitting engagement with the vertical grooves 44a.

In the optical sensor module, the board unit $E_1$ is coupled to the optical waveguide unit $W_1$ with the engagement portions 51a of the board unit $E_1$ in fitting engagement with the vertical grooves 44a of the optical waveguide unit $W_1$. Here, the vertical grooves 44a of the optical waveguide unit $W_1$ are designed so as to be located in the proper positions with respect to the light transmission face 42a of the core 42, and the engagement portions 51a of the board unit $E_1$ are designed so as to be located in the proper positions with respect to the optical element 54. Therefore, the fitting engagement between the vertical grooves 44a and the engagement portions 51a permits self-alignment between the core 42 and the optical element 54. In FIGS. 10A and 10B, a reference character 45 designates a base, and a reference character 45a designates a through-hole provided in the base 45 for receiving the board unit $E_1$. Further, a reference character 51 designates a shaped substrate having the engagement portions 51a, and a reference character 55 designates a sealing resin.

Thus, the optical sensor module permits self-alignment between the core 42 of the optical waveguide unit $W_1$ and the optical element 54 of the board unit $E_1$ without the aligning operation. This eliminates the need for the time-consuming aligning operation, permitting mass production of the optical sensor module at higher productivity.

In recent years, the optical waveguide unit $W_1$ of the optical sensor module has been required to have a reduced width. If the width of the optical waveguide unit $W_1$ is reduced, however, the extension portions 44 cannot be provided in the opposite side portions, but a single extension portion 44 is provided in one of the opposite side portions. In this case, a single board unit engaging vertical groove 44a is provided in the extension portion 44. Even if the board unit $E_1$ is in fitting engagement with the vertical groove 44a, the board unit $E_1$ is unstably supported at a single engagement portion 51a thereof. Therefore, there is a possibility that the proper alignment cannot be achieved even with the board unit $E_1$ in fitting engagement with the vertical groove 44a.

SUMMARY OF THE INVENTION

An optical sensor module is provided in which an engagement portion of a board unit is fitted in a groove of an optical waveguide unit and, even with the single engagement portion, the board unit is stably supported.

An optical sensor module includes: an optical waveguide unit; and a board unit mounted with an optical element and coupled to the optical waveguide unit; the optical waveguide unit including an under-cladding layer, a linear core provided on a surface of the under-cladding layer and serving as an optical path, an over-cladding layer covering the linear core, a single edge extension portion extending along one side edge of the over-cladding layer axially of the core, a board unit engagement groove provided in the single edge extension portion, and a projection projecting from a side wall of the groove and kept in abutment against an engagement portion of the board unit; the board unit including a substrate, an optical element mounted on a predetermined portion of the substrate, and the engagement portion provided in a portion of the substrate and fitted in the board unit engagement groove of the optical waveguide unit; wherein the optical waveguide unit and the board unit are coupled to each other with the engagement portion of the board unit being fitted in the groove of the optical waveguide unit and with the projection in abutment against the engagement portion within the groove such that the light transmission face of the linear core and the optical element are aligned with each other.

In the optical waveguide unit, the board unit engagement groove is in proper positional relation with respect to the light transmission face of the core. In the board unit, the engagement portion fitted in the groove is in proper positional relation with respect to the optical element. With the engagement portion of the board unit being fitted in the groove of the optical waveguide unit, i.e., with the optical waveguide unit being coupled to the board unit, self-alignment is established. In this state, the projection abuts against the engagement portion of the board unit in the groove. Even with the single engagement portion, the board unit can be stably supported. Thus, the core and the optical element can be properly maintained in alignment with each other.

Particularly, where the projection includes projections provided on opposed side walls of the board unit engagement groove so that a recess defined between adjacent ones of projections provided on one of the opposed side walls is opposed to a projection provided on the other side wall, the board unit can be more stably supported. Thus, the core and the optical element can be accurately maintained in alignment with each other.

DETAILED DESCRIPTION OF THE INVENTION

Next, embodiments of the present invention will be described in detail with reference to the drawings.

Figure 1A:
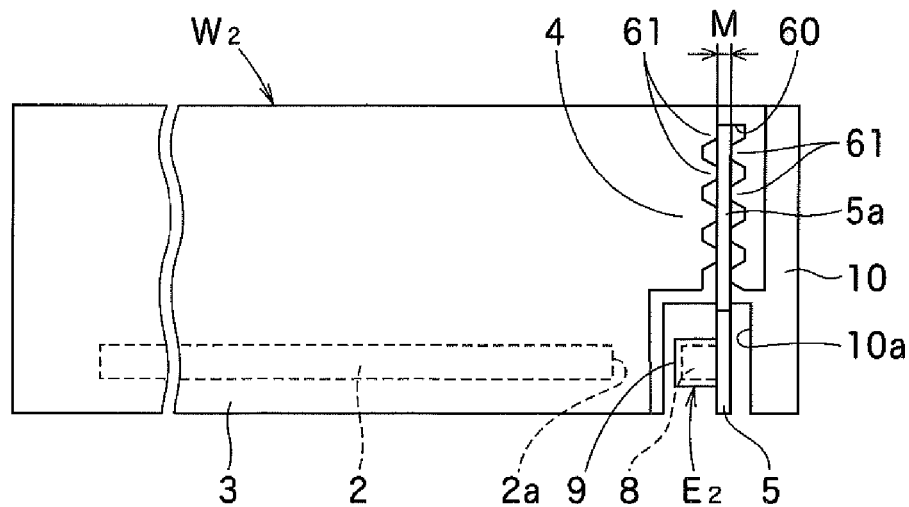
FIG. 1A is a plan view schematically illustrating an optical sensor module.
Figure 1B:
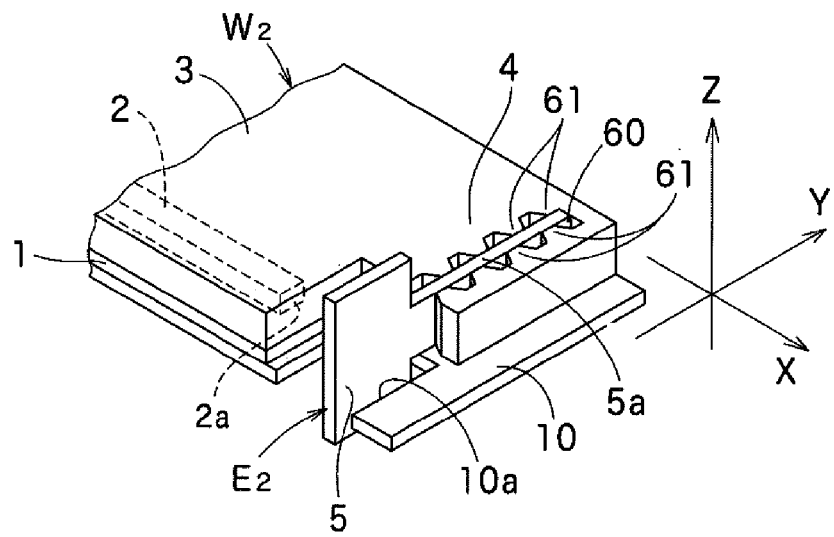
FIG. 1B is a perspective view showing a right end portion of the optical sensor module of FIG. 1A as seen from an upper right side.

FIG. 1A is a plan view illustrating an optical sensor module, and FIG. 1B is a perspective view showing a right end portion of the optical sensor module as seen from an upper right side. That is, the optical waveguide unit $W_2$ has a reduced width, and accordingly has a single extension portion 4 as compared to the conventional optical waveguide unit. Further, projections 61 are provided integrally on side walls of a vertical groove 60 provided in the single extension portion 4. In this embodiment, the projections 61 each extend thicknesswise of the optical waveguide unit $W_2$, and have a trapezoidal cross section. Four projections 61 are provided on each of the opposed side walls of the vertical groove 60. The projections are disposed so that a recess defined between adjacent ones of the projections 61 provided on one of the side walls is opposed to a corresponding one of the projections 61 provided on the other side wall. The board unit $E_2$ includes a single engagement portion 5a provided in one side portion thereof to be fitted in the vertical groove 60.

With the board unit $E_2$ in engagement with the optical waveguide unit $W_2$, the engagement portion 5a provided in the one side portion of the board unit $E_2$ is fitted in the vertical groove 60 with the projections 61 in abutment against opposite surfaces of the engagement portion 5a. Even with the single engagement portion 5a of the board unit $E_2$, the abutment permits stable support of the board unit $E_2$. Even with the single engagement portion 5a, the board unit $E_2$ can be stably supported by providing the projections 61 in the vertical groove 60 of the optical waveguide unit $W_2$ and bringing the projections 61 into abutment against the engagement portion 5a provided in the one side portion of the board unit $E_2$.

More specifically, the optical waveguide unit $W_2$ per se has a reduced width and includes the single extension portion 4 and that the projections 61 are provided on the side walls of the vertical groove 60 provided in the extension portion 4 thereof. For the stable support of the board unit $E_2$, a distance M between ones of the projections opposed to each other in the vertical groove 60 is equal to or slightly smaller than the thickness of the engagement portion 5a of the board unit $E_2$ to be fitted in the vertical groove 60.

The structure of the optical waveguide unit $W_2$ will be described. The optical waveguide unit $W_2$, as shown in plan in FIG. 2A and in perspective in FIG. 2B with its right end viewed from an upper right side, is bonded onto a surface of a base 10 with an adhesive, and includes an under-cladding layer 1 bonded to the surface of the base 10, a core 2 formed in a predetermined linear pattern on a surface of the under-cladding layer 1 and serving as an optical path, and an over-cladding layer 3 provided over the core 2 on the surface of the under-cladding layer 1. In one end portion of the optical waveguide unit $W_2$ (on the right side in FIG. 2A), one side edge portion of the over-cladding layer 3 in which the core 2 is absent extends axially of the core 2 and downward to the surface of the base 10 to define the extension portion 4. The vertical groove 60 is provided in the extension portion 4 as extending thicknesswise through the extension portion 4 perpendicularly to the axial direction of the core 2. The vertical groove 60 is provided in a proper position with respect to a light transmission face 2a of the core 2.

The board unit $E_2$ has the single engagement portion 5a to be fitted in the vertical groove 60 of the optical waveguide unit $W_2$. That is, the board unit $E_2$, as seen in plan in FIG. 3A and seen in perspective from an upper left side in FIG. 3B, includes a shaped substrate 5, an optical element 8 mounted on a surface of the shaped substrate 5 via an insulation layer (not shown) and an optical element mounting pad (not shown), and a sealing resin 9 which seals the optical element 8. The engagement portion 5a to be fitted in the vertical groove (see FIGS. 2A and 2B) is provided in the shaped substrate 5 as protruding in one of lateral directions (protruding leftward in FIG. 3B). The engagement portion 5a is shaped by etching so as to be properly positioned with respect to the optical element mounting pad. Therefore, the engagement portion 5a is provided in a proper position with respect to the optical element 8 mounted on the optical element mounting pad. The protruding length $L_1$ of the engagement portion 5a is preferably equal to the depth of the vertical groove 60. The insulation layer is provided on a surface of a portion of the shaped substrate 5 excluding the engagement portion 5a. The optical element mounting pad is provided on a center portion of a surface of the insulation layer. The optical element 8 is mounted on the optical element mounting pad. The optical element 8 includes a light emitting portion or a light receiving portion, which is provided on a surface of the optical element 8. An electric circuit (not shown) connected to the optical element mounting pad is provided on the surface of the insulation layer.

As shown in FIGS. 1A and 1B, the optical sensor module is configured such that the optical waveguide unit $W_2$ and the board unit $E_2$ are unitarily coupled to each other with the one side engagement portion 5a of the board unit $E_2$ fitted in the vertical groove 60 provided in the one side extension portion 4 of the optical waveguide unit $W_2$. In this state, as described above, the projections 61 in the vertical groove 60 are kept in abutment against the opposite surfaces of the engagement portion 5a fitted in the vertical groove 60. The abutment permits the stable support of the board unit $E_2$.

As described above, the vertical groove 60 of the optical waveguide unit $W_2$ is provided in the proper position with respect to the light transmission face 2a of the core 2. The engagement portion 5a of the board unit $E_2$ is provided in the proper position with respect to the optical element 8. With the engagement portion 5a fitted in the vertical groove 60, therefore, the light transmission face 2a of the core 2 and the optical element 8 are properly positioned to be self-aligned with each other. The fitting engagement permits the optical element 8 to be properly positioned with respect to directions parallel to the surface of the base 10 (i.e., the axial direction of the core 2 (X-axis direction) and a direction (Y-axis direction) perpendicular to the axial direction (X-axis direction) in FIG. 1B). The optical element 8 is positioned with respect to the Y-axis direction, for example, by bringing a lateral distal edge of the engagement portion 5a into abutment against an innermost wall surface of the vertical groove 60 or by properly setting an engagement length of the engagement portion 5a as measured in the Y-axis direction. In the engaged state, a lower edge of the engagement portion 5a protruding in the one direction abuts against the surface of the base 10. The abutment permits proper positioning of the optical element 8 with respect to a direction perpendicular to the surface of the base 10 (i.e., a Z-axis direction in FIG. 1B).

In this embodiment, as shown in FIGS. 1A and 1B, the base 10 has a rectangular cut-away portion 10a in association with the board unit $E_2$, and a part of the board unit $E_2$ projects from a back surface of the base 10. The projecting part of the board unit $E_2$ is connected, for example, to a motherboard (not shown) provided on the rear side of the base 10 for transmission of signals to the optical element 8.

The optical sensor module is produced through the following steps (1) to (3):
(1) producing the optical waveguide unit $W_2$ (see FIGS. 4A and 4B and FIGS. 5A to 5D which correspond to the vertical sectional view of FIG. 1A for explaining this step);
(2) producing the board unit $E_2$ (see FIGS. 6A to 6D); and
(3) combining the board unit $E_2$ with the optical waveguide unit $W_2$.

The step (1) of producing the optical waveguide unit $W_2$ will be described. First, a planar substrate 20 (see FIG. 4A) to be used for formation of the under-cladding layer 1 is prepared. Exemplary materials for the substrate 20 include glass, quartz, silicon, resins and metals. Particularly, a stainless steel substrate is preferred. The stainless steel substrate is excellent in thermal expansion/contraction resistance, so that dimensions of various components of the optical waveguide unit can be substantially maintained as designed during the production of the optical waveguide unit. The thickness of the substrate 20 is, for example, in the range of 20 µm to 1 mm.

Figure 4A:
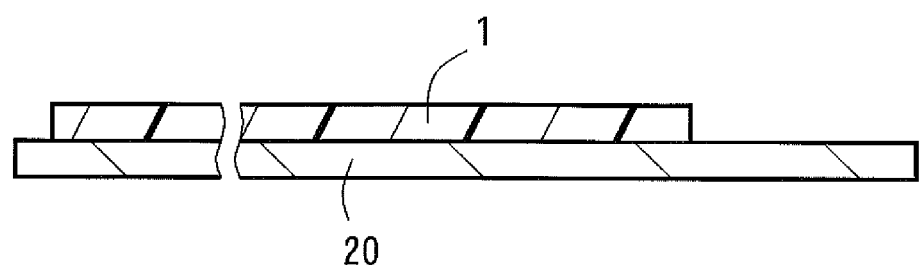
FIG. 4A is a schematic diagram for explaining the step of forming an under-cladding layer of the optical waveguide unit.

Then, as shown in FIG. 4A, the under-cladding layer 1 is formed on a predetermined area of a surface of the substrate 20 by a photolithography process. A photosensitive resin such as a photosensitive epoxy resin is used as a material for the under-cladding layer 1. The thickness of the under-cladding layer 1 is typically, for example, in the range of 1 to 50 µm.

Figure 4B:
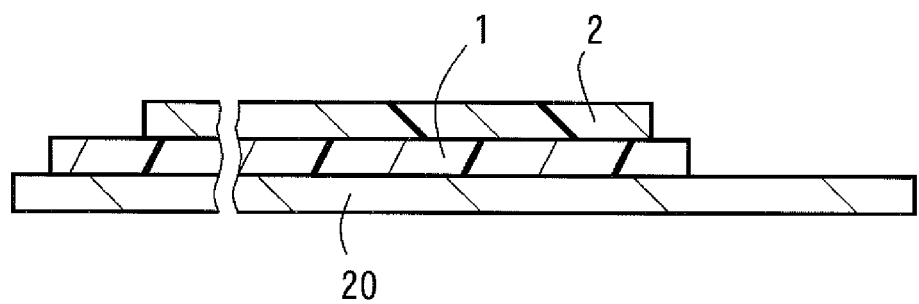
FIG. 4B is a schematic diagram for explaining a core formation step following the step of FIG. 4A.

Next, as shown in FIG. 4B, the core 2 is formed in a predetermined pattern on a surface of the under-cladding layer 1 by a photolithography process. A photosensitive resin similar to that used for the under-cladding layer 1, for example, is used as a material for the core 2. The core material has a higher refractive index than the material for the under-cladding layer 1 and a material for the over-cladding layer 3 (see FIG. 5C). The refractive index may be adjusted, for example, by selection of the types of the materials for the under-cladding layer 1, the core 2 and the over-cladding layer 3 and adjustment of the formulations of the materials. The thickness of the core 2 is, for example, in the range of 5 to 100 µm. The width of the core 2 is, for example, in the range of 5 to 100 µm.

Next, a molding die 30 (see FIG. 5A) is prepared. The molding die 30 is used for simultaneously forming the over-cladding layer 3 (see FIG. 5C) and the extension portion 4 of the over-cladding layer 3 having the board unit engagement vertical groove 60 (see FIG. 5C) by die molding. The molding die 30 has a recess 31 provided in a lower surface thereof and having a die surface complementary in shape to the over-cladding layer 3 as seen in perspective from a lower side in FIG. 5A. The recess 31 includes a portion 31a for formation of the extension portion 4, and a portion 31b for formation of a lens portion 3b (see FIG. 5C). The extension formation portion 31a has a rib 32 for formation of the board unit engagement vertical groove 60. Further, the rib 32 has grooves 32a formed in surfaces thereof for formation of the projections 61 (see FIG. 2A) on the side walls of the vertical groove 60. The molding die 30 has alignment marks (not shown) formed on an upper surface thereof for proper positioning thereof in alignment with the light transmission face 2a (a right end face in FIG. 5B) of the core 2 when being used. The recess 31 and the rib 32 are provided in proper positions with respect to the alignment marks.

The molding die 30 is set with the alignment marks thereof in alignment with the light transmission face 2a of the core 2. In this state, the over-cladding layer 3 and the board unit engagement vertical groove 60 are simultaneously formed in the proper positions with respect to the light transmission face 2a of the core 2 by molding. When the molding die 30 is set, the lower surface of the molding die 30 is brought into intimate contact with the surface of the substrate 20, whereby a space defined by die surface portions of the recess 31 and the rib 32, the surface of the substrate 20, the surface of the under-cladding layer 1 and the surface of the core 2 serves as a mold cavity 33. Further, the molding die 30 has an inlet (not shown) communicating with the recess 31 for injecting an over-cladding layer formation resin therethrough into the mold cavity 33.

A photosensitive resin similar to that used for the under-cladding layer 1, for example, is used as the over-cladding layer formation resin. In this case, the photosensitive resin filled in the mold cavity 33 should be exposed to radiation such as ultraviolet radiation through the molding die 30 and, therefore, the molding die 30 is made of a material (e.g., quartz) transmissive to the radiation. Alternatively, a thermosetting resin may be used as the over-cladding layer formation resin. In this case, the molding die 30 is not necessarily required to be transparent. For example, the molding die 30 may be made of a metal or quartz.

Figure 5A:
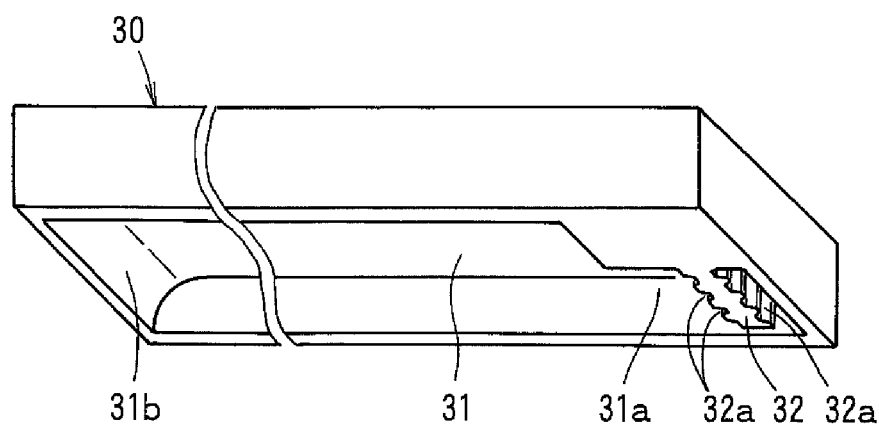
FIG. 5A is a perspective view schematically illustrating a molding die to be used for formation of an over-cladding layer of the optical waveguide unit.
Figure 5B:
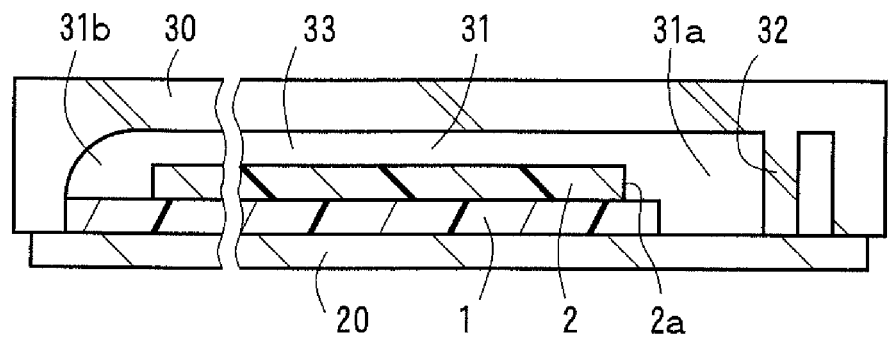
FIGS. 5B to 5D are schematic diagrams for explaining the step of forming the over-cladding layer.
Figure 5C:
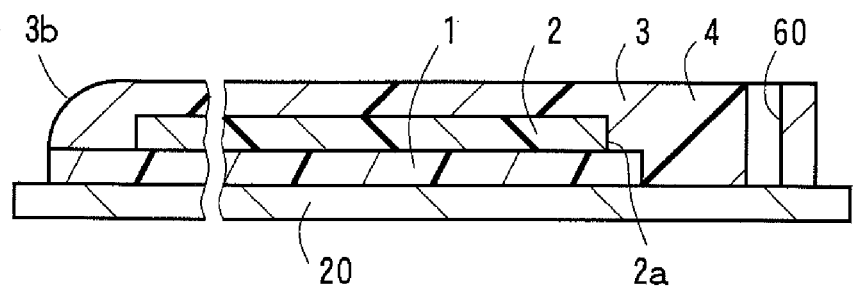

Then, as shown in FIG. 5B, the entire molding die 30 is properly positioned with the alignment marks thereof in alignment with the light transmission face 2a of the core 2 and, in this state, the lower surface of the molding die 30 is brought into intimate contact with the surface of the substrate 20. Then, the over-cladding layer formation resin is injected through the inlet of the molding die 30 into the mold cavity 33 defined by the die surface portions of the recess 31 and the rib 32, the surface of the substrate 20, the surface of the under-cladding layer 1 and the surface of the core 2 to fill the mold cavity 33. Where the resin is the photosensitive resin, the resin is exposed to radiation such as ultraviolet radiation through the molding die 30 and then heat-treated. Where the resin is the thermosetting resin, the resin is heat-treated. Thus, the over-cladding layer formation resin is cured to simultaneously form the over-cladding layer 3 and the board unit engagement vertical groove 60 (the extension portion 4 of the over-cladding layer 3). Where the under-cladding layer 1 and the over-cladding layer 3 are made of the same material, the under-cladding layer 1 and the over-cladding layer 3 are merged together at contact portions thereof.

Then, the molding die is removed. Thus, the over-cladding layer 3, the extension portion 4 and the board unit engagement vertical groove 60 (including the projections 61) are provided as shown in FIG. 5A. As described above, the board unit engagement vertical groove 60 (including the projections 61) is formed with respect to the light transmission face 2a of the core 2 by using the molding die 30 and, therefore, properly positioned with respect to the light transmission face 2a of the core 2. Further, the lens portion 3b of the over-cladding layer 3 is also properly positioned.

The thickness of the over-cladding layer 3 is typically greater than the thickness of the core 2 and not greater than 1200 μm (as measured from the surface of the under-cladding layer 1). As described above, the board unit engagement vertical groove 60 (including the projections 61) is dimensioned so as to conform to the dimensions of the engagement portion 5a of the board unit $E_2$ to be fitted in the vertical groove 60. For example, the distance M between the projections 61 opposed to each other in the vertical groove 60 (see FIG. 1A) is in the range of 0.025 to 0.15 mm. The depth of the vertical groove 60 (as measured in the Y-axis direction in FIG. 1B) is, for example, in the range of 3 to 30 mm. The projection amount (projection height) of each of the projections 61 is, for example, in the range of 0.2 to 1.5 mm. The vertex width of the trapezoidal cross section of the projection 61 is, for example, in the range of 0.5 to 5 mm.

Figure 5D:
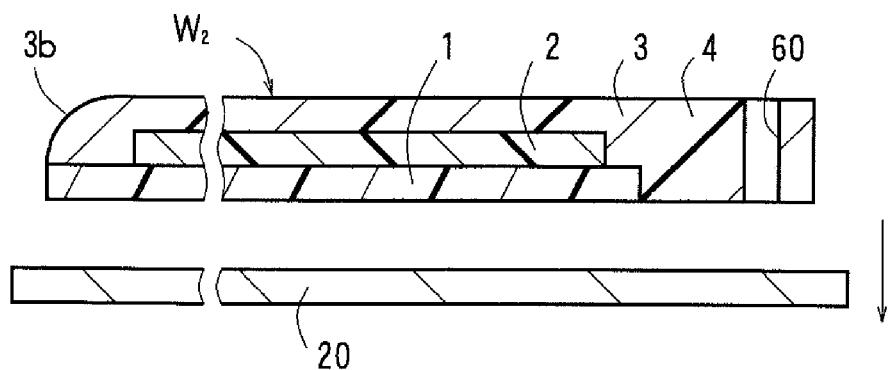

Then, as shown in FIG. 5D, the substrate 20 is removed from aback surface of the under-cladding layer (see arrow in FIG. 5D). Thus, the step (1) of producing the optical waveguide unit $W_2$ is completed to provide the optical waveguide unit $W_2$, which includes the under-cladding layer 1, the core 2 and the over-cladding layer 3 including the board unit engagement vertical groove 60 (including the projections 61) provided in the extension portion 4.

Figure 2A:
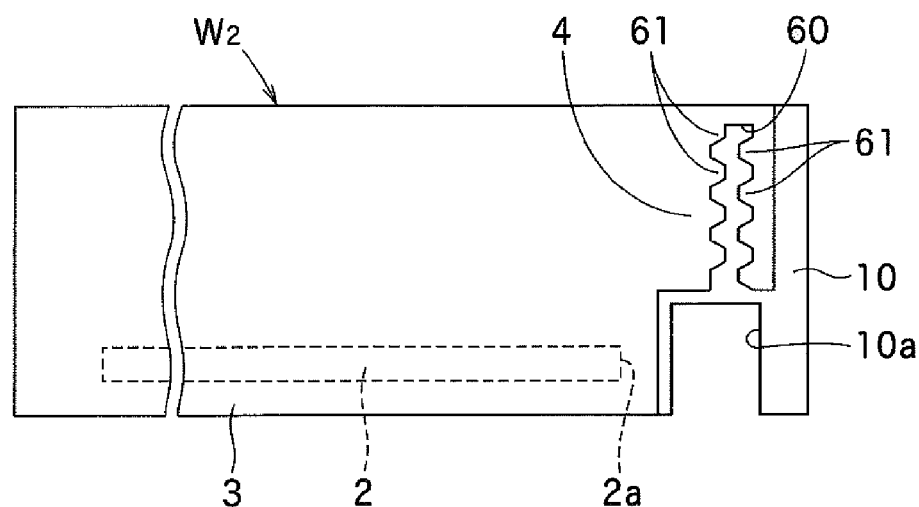
FIG. 2A is a plan view schematically illustrating an optical waveguide unit of the optical sensor module.
Figure 2B:
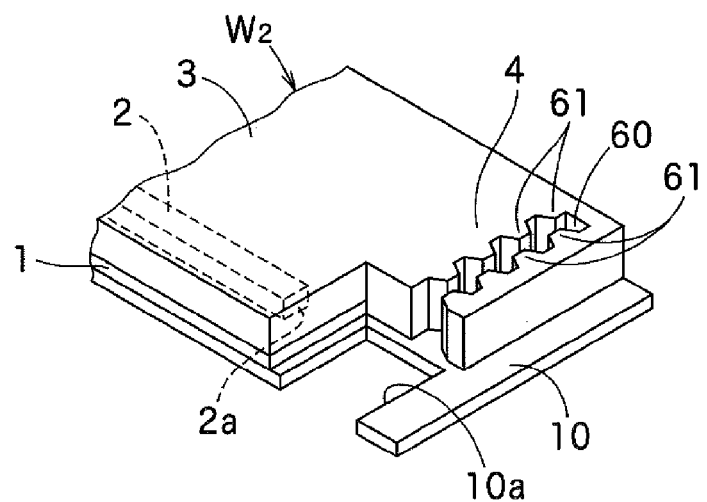
FIG. 2B is a perspective view showing a right end portion of the optical waveguide unit of FIG. 2A as seen from an upper right side.
Figure 3A:
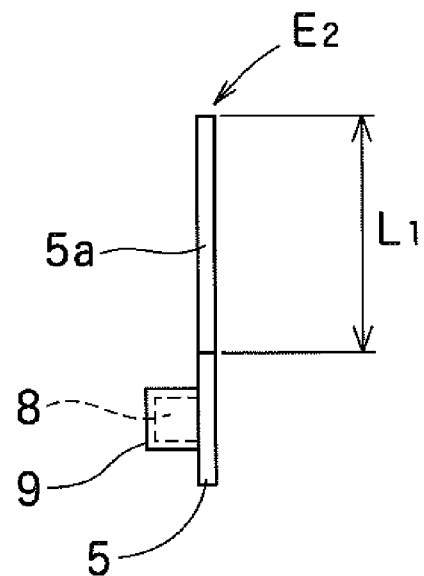
FIG. 3A is a plan view schematically illustrating a board unit of the optical sensor module.
Figure 3B:
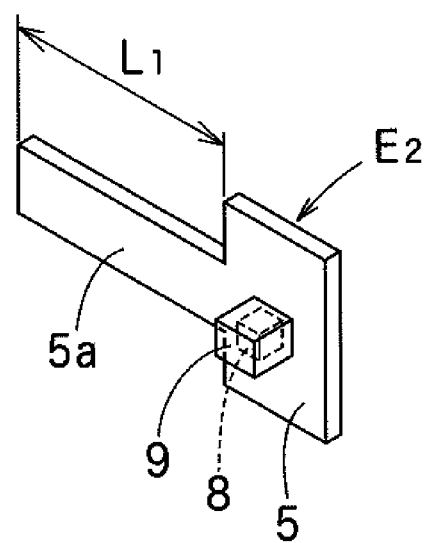
FIG. 3B is a perspective view showing a left side portion of the board unit of FIG. 3A as seen from an upper left side.

Then, as shown in FIGS. 2A and 2B, the optical waveguide unit $W_2$ is bonded onto a base 10 such as an acryl plate with an adhesive. At this time, the under-cladding layer 1 adheres to the base 10. A plate having no irregularities on its surface is used as the base 10. The base 10 may be of any material, and may have any degree of transparency and any thickness. Other examples of the plate include a polypropylene (PP) plate, a metal plate, a ceramic plate, a quartz glass and a blue glass plate. The thickness of the base 10 is, for example, in the range of 100 μm to 5 mm.

Next, the step (2) of producing the board unit $E_2$ will be described. First, a substrate 5A (see FIG. 6A) serving as a base material for the shaped substrate 5 is prepared. Exemplary materials for the substrate 5A include metals and resins. In particular, a stainless steel substrate is preferred for easy processability and dimensional stability. The thickness of the substrate 5A is, for example, in the range of 0.02 to 0.1 mm.

Figure 6A:
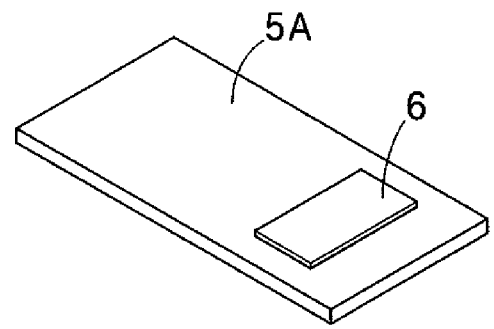
FIGS. 6A to 6D are schematic diagrams for explaining a production process for the board unit.

Then, as shown in FIG. 6A, a varnish prepared by dissolving an insulation layer formation photosensitive resin such as a photosensitive polyimide resin in a solvent is applied onto a predetermined surface area of the substrate 5A. Thereafter, the applied varnish is heat-treated, as required, to be dried. Thus, a photosensitive resin layer for formation of the insulation layer is formed. Then, the photosensitive resin layer is exposed to radiation such as ultraviolet radiation via a photomask, whereby the insulation layer 6 is formed in a predetermined pattern. The thickness of the insulation layer 6 is typically in the range of 5 to 15 μm.

Figure 6B:
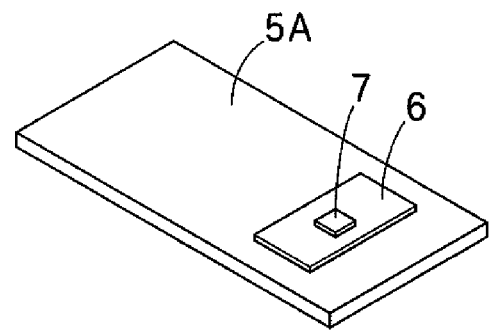

Next, as shown in FIG. 6B, the optical element mounting pad 7 and the electric circuit (not shown) connected to the optical element mounting pad 7 are formed on a surface of the insulation layer 6. The formation of the mounting pad (including the electric circuit) 7 is achieved, for example, in the following manner. First, a metal layer (having a thickness of about 60 to about 260 nm) is formed on the surface of the insulation layer 6 by sputtering, electroless plating or the like. The metal layer later serves as a seed layer (a layer serving as a base for formation of an electrolytic plating layer) in a subsequent electrolytic plating process. In turn, dry resist films are respectively affixed to opposite surfaces of a stack including the substrate 5A, the insulation layer 6 and the seed layer. Thereafter, a pattern opening for the mounting pad (including the electric circuit) 7 is simultaneously formed in one of the dry resist films formed on the seed layer by a photolithography process to uncover a surface portion of the seed layer on a bottom of the opening. Then, an electrolytic plating layer (having a thickness of about 5 to about 20 μm) is formed on the uncovered surface portion of the seed layer on the bottom of the opening by electrolytic plating. Then, the dry resist films are removed with the use of an aqueous sodium hydroxide solution or the like. Thereafter, a portion of the seed layer not formed with the electrolytic plating layer was removed by soft etching. Thus, a stack portion including a remaining electrolytic plating layer portion and an underlying seed layer portion is formed as the mounting pad (including the electric circuit) 7.

Figure 6C:
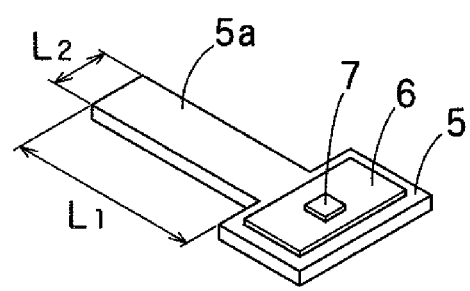

Then, as shown in FIG. 6C, the substrate 5A is shaped to form the shaped substrate 5 including the engagement portion 5a disposed in the proper position with respect to the mounting pad 7. The formation of the shaped substrate 5 is achieved, for example, in the following manner. First, the back surface of the substrate 5A is covered with a dry resist film. The dry resist film is patterned by a photolithography process to be partly left as having an intended shape such that the engagement portion 5a is provided in the proper position with respect to the mounting pad 7. Then, a portion of the substrate 5A uncovered with the remaining dry resist film portion is etched off with the use of an aqueous ferric chloride solution. Thus, the shaped substrate 5 having the engagement portion 5a is formed from the substrate 5A. In turn, the remaining dry resist film portion is removed with the use of an aqueous sodium hydroxide solution or the like. The engagement portion 5a of the shaped substrate 5 has, for example, a horizontal dimension (protruding length) $L_1$ of 5 to 25 mm, and a height $L_2$ of 0.3 to 5.0 mm.

Figure 6D:
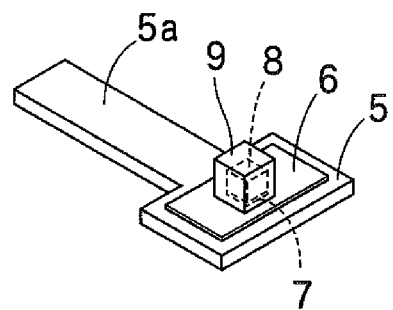

After the optical element 8 is mounted on the mounting pad 7, as shown in FIG. 6D, the optical element 8 and its peripheral portion are sealed with a transparent resin by potting. A mounting machine is used for the mounting of the optical element 8. The optical element 8 is accurately positioned on the mounting pad 7 by means of a positioning device such as a positioning camera provided in the mounting machine. Thus, the step (2) of producing the board unit $E_2$ is completed to provide the board unit $E_2$, which includes the shaped substrate 5 having the engagement portion 5a, the insulation layer 6, the mounting pad 7, the optical element 8 and the sealing resin 9. In the board unit $E_2$, as described above, the engagement portion 5a is formed with respect to the mounting pad 7, so that the optical element 8 mounted on the mounting pad 7 is disposed in proper positional relation to the engagement portion 5a.

Next, the step (3) of combining the optical waveguide unit $W_2$ and the board unit $E_2$ together will be described. With a surface (the light emitting portion or the light receiving portion) of the optical element 8 of the board unit $E_2$ (see FIGS. 3A and 3B) facing toward the light transmission face 2a of the core 2 of the optical waveguide unit $W_2$ (see FIGS. 2A and 2B), the engagement portion 5a of the board unit $E_2$ is fitted in the board unit engagement vertical groove 60 of the optical waveguide unit $W_2$, whereby the optical waveguide unit $W_2$ and the board unit $E_2$ are combined together (see FIGS. 1A and 1B). At this time, the lower edge of the engagement portion 5a abuts against the surface of the base 10. For the fitting engagement, the engagement portion 5a may be inserted into the vertical groove 60 from an upper side or a lateral side. As required, the engagement portion 5a may be fixed in the vertical groove 60 with an adhesive. Thus, the intended optical sensor module is completed.

Here, the light transmission face 2a of the core 2 is in proper positional relation with respect to the board unit engagement vertical groove 60 in the optical waveguide unit $W_2$ as described above. Further, the optical element 8 and the engagement portion 5a are in proper positional relation in the board unit $E_2$ mounted with the optical element 8. By thus producing the optical sensor module with the engagement portion 5a fitted in the vertical groove 60, therefore, the light transmission face 2a of the core 2 and the optical element 8 are self-aligned. As a result, the aligning operation is obviated.

Figure 7A:
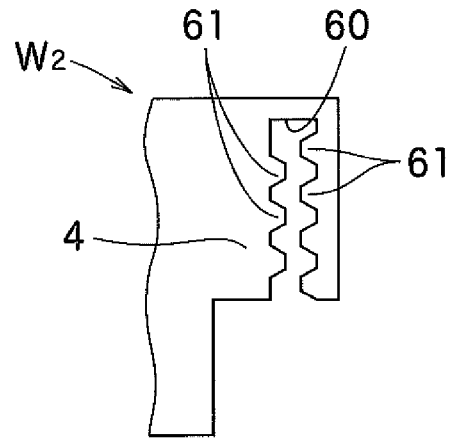
FIGS. 7A to 7C are plan views schematically illustrating vertical grooves of optical sensor modules.
Figure 7B:
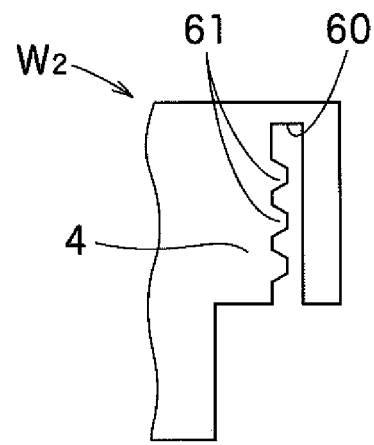
Figure 7C:
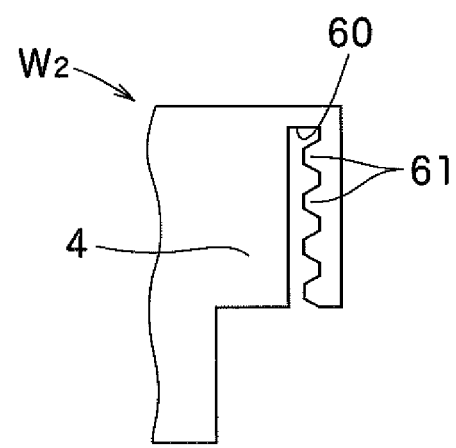

FIGS. 7A to 7C are plan views schematically illustrating vertical grooves 60 of optical sensor modules according to other embodiments. These embodiments each feature the arrangement of projections 61 in the vertical groove 60 of the optical waveguide unit $W_2$. In FIG. 7A, an innermost one of the projections 61 provided on the one side wall of the vertical groove 60 in FIG. 2A is eliminated. That is, three projections 61 are provided on the one side wall, and four projections 61 are provided on the other side wall. In FIGS. 7B and 7C, projections 61 are provided on either of the side walls of the vertical groove 60 (three projections in FIG. 7B, and four projections in FIG. 7C). In FIGS. 7A to 7C, the other components are configured in the same manner as in the embodiment shown in FIGS. 1A and 1B. The embodiments shown in FIGS. 7A to 7C have the same features and effects as the embodiment shown in FIGS. 1A and 1B.

In the embodiments described above, the projections 61 in the board unit engagement vertical groove 60 each have a trapezoidal cross sectional shape, but may have another shape, e.g., a rectangular shape, a semicircular shape, a triangular shape or the like. The number of the projections 61 may be properly determined. Where the projections 61 are provided on the side walls opposed to each other in the vertical groove 60 as shown in FIGS. 2A and 7A, for example, one or more projections may be provided on one of the side walls, and two or more projections may be provided on the other side wall. Where the projections 61 are provided on either one of the side walls in the vertical groove 60 as in FIGS. 7B and 7C, the number of the projections may be one or more.

In the embodiments described above, the side walls of the vertical groove 60 have the same length (as measured in the Y-axis direction in FIG. 1B), but may be different, i.e., one of the side walls may have a longer length. In FIG. 1B, the engagement portion 5a of the board unit $E_2$ fitted in the vertical groove 60 is illustrated as having the same height $L_2$ (see FIG. 6C) as the vertical groove 60, but the height $L_2$ of the engagement portion 5a may be greater or smaller than the vertical groove 60 as long as the board unit $E_2$ can be supported by the fitting engagement.

In the embodiments described above, the engagement portion 5a is fixed in the vertical groove 60 with the adhesive, as required, after the engagement portion 5a is fitted in the vertical groove 60. Where the adhesive is used, the adhesive may be first applied to the vertical groove 60, and then the engagement portion 5a may be fitted in the vertical groove 60 before the adhesive is solidified. Thus, the adhesive serves as a lubricant, thereby facilitating the fitting engagement. In this case, it is preferred in terms of operation efficiency that the engagement portion 5a is inserted into the vertical groove 60 from the lateral side to be fitted in the vertical groove 60.

In the embodiments described above, the optical waveguide unit $W_2$ is bonded to the surface of the base 10 with the adhesive. The base 10 may be provided on the entire lower surface of the under-cladding layer 1 of the optical waveguide unit $W_2$, or may be provided on a part of the optical waveguide unit $W_2$ associated with the vertical groove 60 in which the board unit $E_2$ is fitted. Alternatively, no base 10 may be provided. Where no base 10 is provided, the optical waveguide unit $W_2$ is placed on the surface of the substrate 10 without the use of the adhesive, and then the base 10 is removed after the board unit $E_2$ is fitted in the vertical groove 60.

Figure 8:
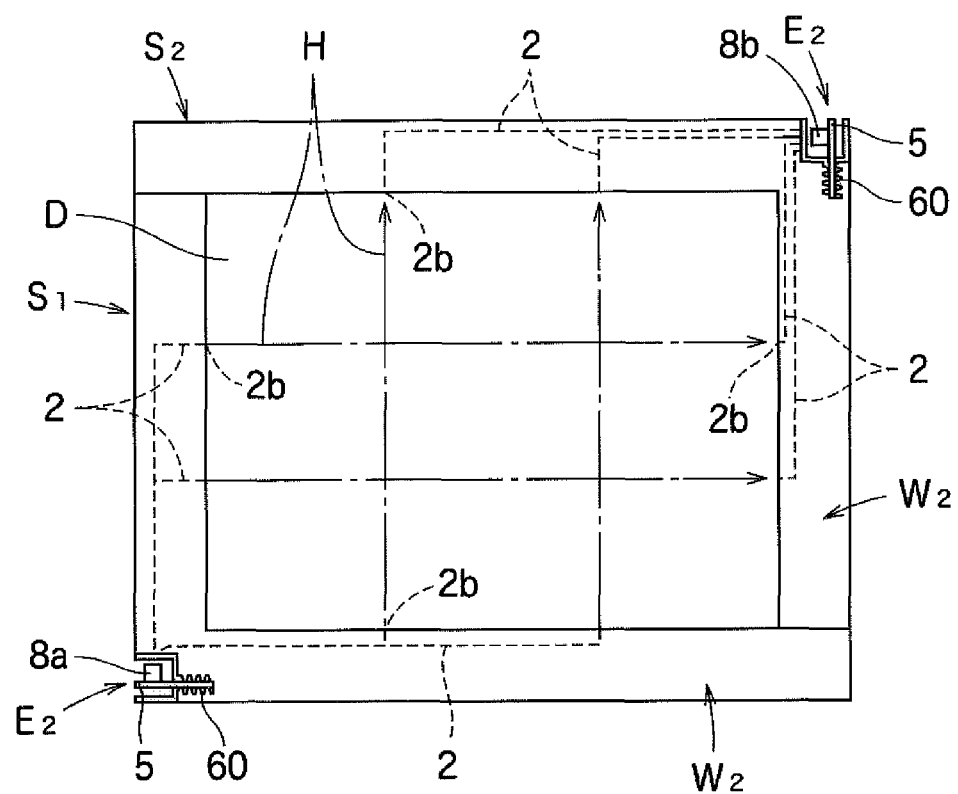
FIG. 8 is a plan view schematically illustrating detection means for a touch panel employing the optical sensor module.
Figure 9A:
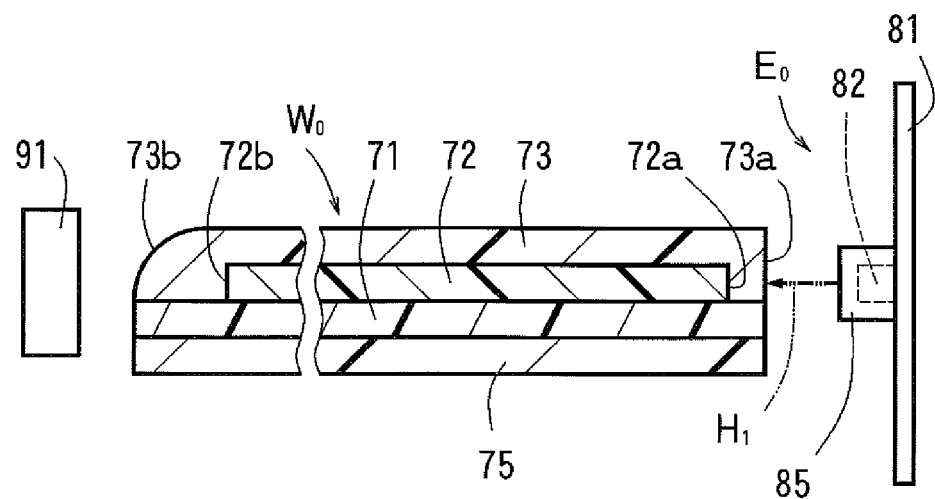
FIGS. 9A and 9B are schematic diagrams for explaining an alignment method for a conventional optical sensor module.
Figure 9B:
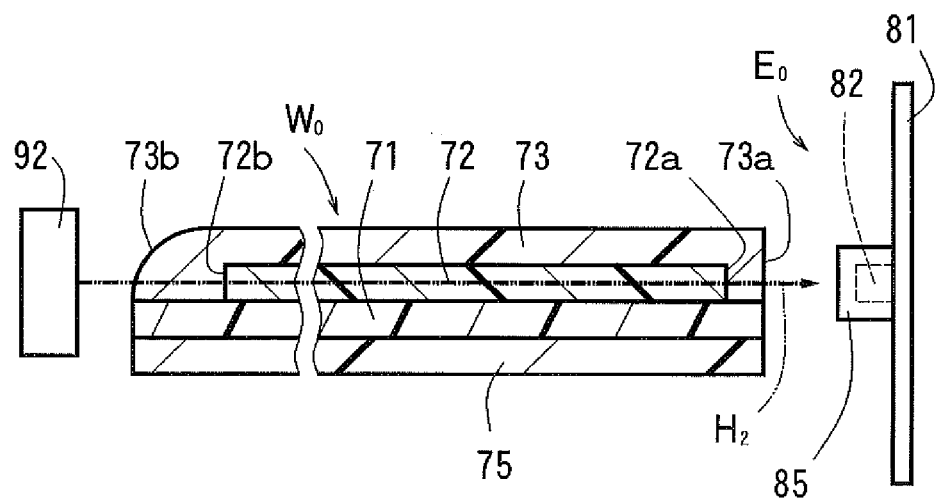
Figure 10A:
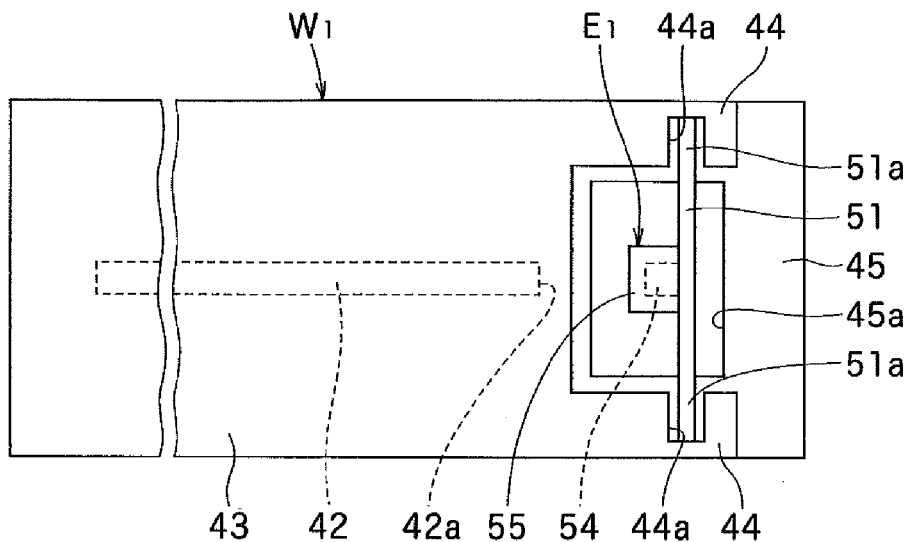
FIG. 10A is a plan view schematically illustrating an optical sensor module described in a patent application previously filed by the assignee of the present invention.
Figure 10B:
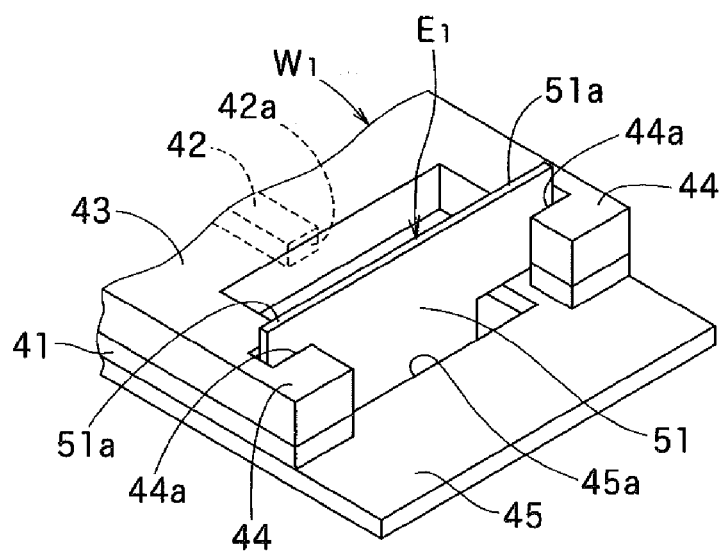
FIG. 10B is a perspective view illustrating a right end portion of the optical sensor module of FIG. 10A as seen from an upper right side.

As shown in FIG. 8, the optical sensor module may be embodied in the form of two L-shaped optical sensor modules $S_1$, $S_2$, which are arranged in a rectangular frame shape for use as finger touch position detecting means for a touch panel. In one L-shaped optical sensor module $S_1$, more specifically, a board unit $E_2$ mounted with a light emitting element 8a is engaged with an optical waveguide unit $W_2$ at a corner, and end faces 2b of cores 2 from which light beams H are emitted and a lens surface of an over-cladding layer 3 are directed inward of the frame. In the other L-shaped optical sensor module $S_2$, a board unit $E_2$ mounted with a light receiving element 8b is engaged with an optical waveguide unit $W_2$ at a corner, and a lens surface of an over-cladding layer 3 on which light beams H are incident and end faces 2b of cores 2 are directed inward of the frame. The two L-shaped optical sensor modules are disposed along peripheral edges of a rectangular screen of a rectangular display D of the touch panel to surround the screen, so that the light beams H emitted from the one L-shaped optical sensor module $S_1$ can be received by the other L-shaped optical sensor module $S_2$. Thus, the emitted light beams H travel parallel to the screen of the display D in a lattice form on the screen. Therefore, when the screen of the display D is touched by a finger, some of the emitted light beams H are blocked by the finger. A finger touch position can be detected by detecting a light blocked portion by the light receiving element 8b. In FIG. 8, the cores 2 are shown by broken lines, and the thicknesses of the cores 2 are indicated by the thicknesses of the broken lines. In FIG. 8, some of the cores 2 are not shown.

Next, an inventive example will be described. It should be understood that the present invention be not limited to the inventive example.

EXAMPLE

<Materials for Under-Cladding Layer and Over-Cladding Layer (Including Extension Portion)>

An under-cladding layer material and an over-cladding layer material were prepared by mixing 35 parts by weight of bisphenoxyethanolfluorene diglycidyl ether (Component A), 40 parts by weight of 3',4'-epoxycyclohexylmethyl-3,4-epoxycyclohexane carboxylate as an alicyclic epoxy resin (CELLOXIDE 2021P manufactured by Daicel Chemical Industries, Ltd.) (Component B), 25 parts by weight of (3',4'-epoxycyclohexane)methyl-3',4'-epoxycyclohexy 1 carboxylate (CELLOXIDE 2081 manufactured by Daicel Chemical Industries, Ltd.) (Component C), and 2 parts by weight of a 50 wt % propione carbonate solution of 4,4'-bis[di(β-hydroxyethoxy)phenylsulfinio] phenylsulfide bishexafluoroantimonate (Component D).

<Material for Core>

A core material was prepared by dissolving 70 parts by weight of Component A, 30 parts by weight of 1,3,3-tris{4-[2-(3-oxetanyl)]butoxyphenyl}butane and 1 part by weight of Component D in ethyl lactate.

<Production of Optical Waveguide Unit>

An optical waveguide unit was produced on a stainless steel substrate in the same manner as in the embodiment described above by using the under-cladding layer material, the core material and the over-cladding layer material. Then, the stainless steel substrate was removed from a back surface of an under-cladding layer, and the resulting optical waveguide unit was bonded onto an acryl plate with an adhesive.

A vertical groove formed in an extension portion of an over-cladding layer had a construction shown in FIG. 2A. The extension portion had a height (thickness) of 1 mm. The vertical groove was dimensioned such that: a distance between opposed projections was 0.05 mm; the vertical groove had a depth of 13.47 mm; and the projections each had a projection amount (projection height) of 1 mm and their trapezoidal cross sections each had a vertex width of 1 mm.

<Production of Board Unit>

In the same manner as in the embodiment described above, an insulation layer, an optical element mounting pad and an electric circuit were formed on a surface portion of a stainless steel substrate (25 mm×30 mm×0.05 mm (thickness)), whereby an engagement portion to be fitted in the vertical groove was formed in one side portion of the stainless steel substrate. The engagement portion had a height of 1 mm and a horizontal length (protruding length) of 15 mm.

After a silver paste was applied onto a surface of the optical element mounting pad, a light emitting element of a wire bonding type (SM85-1N001 manufactured by Optowell Co., Ltd.) was mounted on the optical element mounting pad via the silver paste. Thereafter, the light emitting element and its peripheral portion were sealed with a transparent resin (NT-8038 manufactured by Nitto Denko Corporation) by potting. In this manner, the board unit was produced.

<Production of Optical Sensor Module>

An adhesive was applied in the board unit positioning vertical groove of the optical waveguide unit and, before the adhesive was solidified, the engagement portion of the board unit was slid in a lateral direction into fitting engagement with the vertical groove. Then, a lateral distal edge of the engagement portion was brought into abutment against an innermost wall surface of the vertical groove, and a lower edge of the engagement portion was brought into abutment against a surface of the acryl plate. Thereafter, the adhesive was solidified. In this manner, the optical sensor module was produced.

<Light Transmission Test>

Electric current was supplied to the light emitting element of the optical sensor module of the embodiment to emit light from the light emitting element. It was confirmed that the light was outputted from the other end of the optical sensor module.

The result indicates that, even without the aligning operation for aligning the core of the optical waveguide unit with the light emitting element of the board unit, the optical sensor module produced by the production method described above ensures proper light transmission.

The optical sensor module is usable as finger touch position detecting means for a touch panel, or an information communication device, a signal processing device or the like which transmits and processes audio and image digital signals at a higher speed.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An optical sensor module, comprising:
    an optical waveguide unit; and
    a board unit mounted with an optical element and coupled to the optical waveguide unit;
    wherein the optical waveguide unit includes an under-cladding layer, a linear core provided on a surface of the under-cladding layer and serving as an optical path, an over-cladding layer covering the linear core, a single edge extension portion extending along one side edge of the over-cladding layer axially of the core, a board unit engagement groove provided in the single edge extension portion, and a projection projecting from a side wall of the groove and kept in abutment against an engagement portion of the board unit;
    wherein the board unit includes a substrate, an optical element mounted on a predetermined portion of the substrate, and the engagement portion provided in a portion of the substrate and fitted in the board unit engagement groove of the optical waveguide unit;

wherein the optical waveguide unit and the board unit are coupled to each other with the engagement portion of the board unit being fitted in the groove of the optical waveguide unit and with the projection in abutment against the engagement portion within the groove such that the light transmission face of the linear core and the optical element are aligned with each other;

wherein the projection includes projections provided on opposed side walls of the board unit engagement groove so that a recess defined between adjacent ones of projections provided on one of the opposed side walls is opposed to a projection provided on the other side wall.

* * * * *